United States Patent
Suzuki et al.

(10) Patent No.: US 7,868,913 B2
(45) Date of Patent: Jan. 11, 2011

(54) APPARATUS FOR CONVERTING IMAGES OF VEHICLE SURROUNDINGS

(75) Inventors: Masayasu Suzuki, Yokosuka (JP); Takeshi Akatsuka, Yokohama (JP); Ken Oizumi, Tokyo (JP)

(73) Assignee: Nissan Motor Co., Ltd., Yokohmama-shi, Kanagawa-ken (JP)

( * ) Notice: Subject to any disclaimer, the term of this patent is extended or adjusted under 35 U.S.C. 154(b) by 1184 days.

(21) Appl. No.: 10/959,219

(22) Filed: Oct. 7, 2004

(65) Prior Publication Data

US 2005/0078185 A1   Apr. 14, 2005

(30) Foreign Application Priority Data

Oct. 10, 2003   (JP) .......................... P2003-352278
Dec. 2, 2003    (JP) .......................... P2003-402416

(51) Int. Cl.
    *H04N 7/18* (2006.01)
(52) U.S. Cl. ........................... 348/148; 348/143
(58) Field of Classification Search .......... 348/148–149
    See application file for complete search history.

(56) References Cited

U.S. PATENT DOCUMENTS

| 4,266,242 | A | * | 5/1981  | McCoy ........................ 348/588 |
| 5,111,401 | A | * | 5/1992  | Everett et al. ................. 701/24 |
| 5,139,327 | A | * | 8/1992  | Tanaka ....................... 356/3.14 |
| 5,892,855 | A | * | 4/1999  | Kakinami et al. ............ 382/291 |
| 6,002,428 | A | * | 12/1999 | Matsumura et al. ......... 348/169 |
| 7,023,913 | B1 | * | 4/2006  | Monroe ................. 375/240.01 |
| 7,126,460 | B2 | * | 10/2006 | Yamada ...................... 340/435 |

FOREIGN PATENT DOCUMENTS

| JP | SHO60-126859    | 8/1985  |
| JP | 63-189057       | 8/1988  |
| JP | 04-051679       | 2/1992  |
| JP | 11-328368       | 11/1999 |
| JP | 2002-027433     | 1/2002  |
| JP | 2003-250153 (A) | 9/2003  |

OTHER PUBLICATIONS

Japanese Office Action w/English Translation.

* cited by examiner

*Primary Examiner*—David Czekaj
(74) *Attorney, Agent, or Firm*—McDermott Will & Emery LLP

(57) ABSTRACT

An aspect of the present invention provides an apparatus for converting images of vehicle surroundings that includes, at least one camera configured to start, upon receiving a synchronizing signal, photographing the surroundings of a vehicle and outputting image data representative of the photographs, an output memory configured to store image data to be displayed on a display installed in the vehicle, a pattern memory configured to store destination addresses of the output memory, and an image converter configured to generate the synchronizing signal, obtain the image data from the camera, and transfer part or the whole of the image data to the output memory according to the destination addresses stored in the pattern memory.

13 Claims, 11 Drawing Sheets

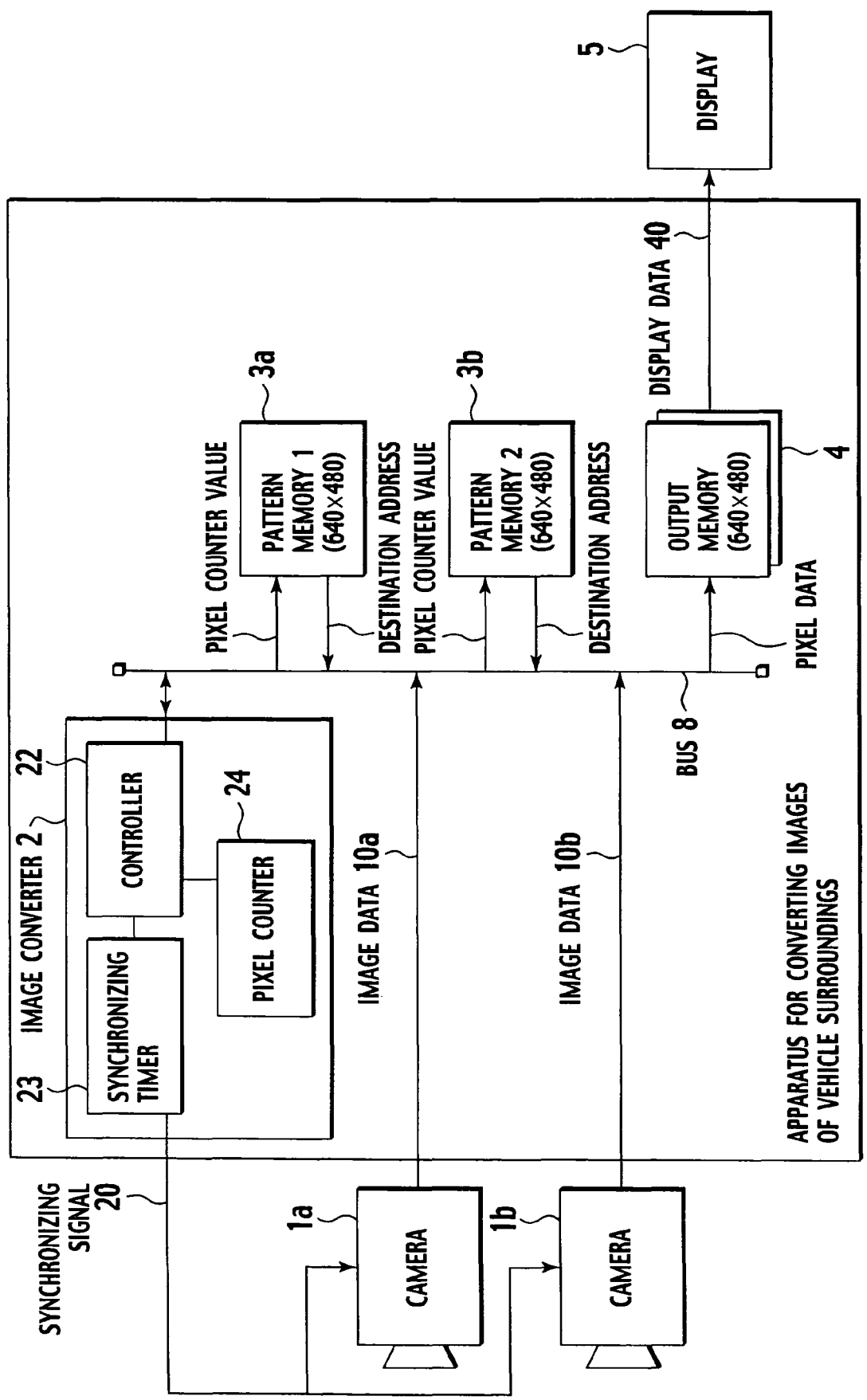

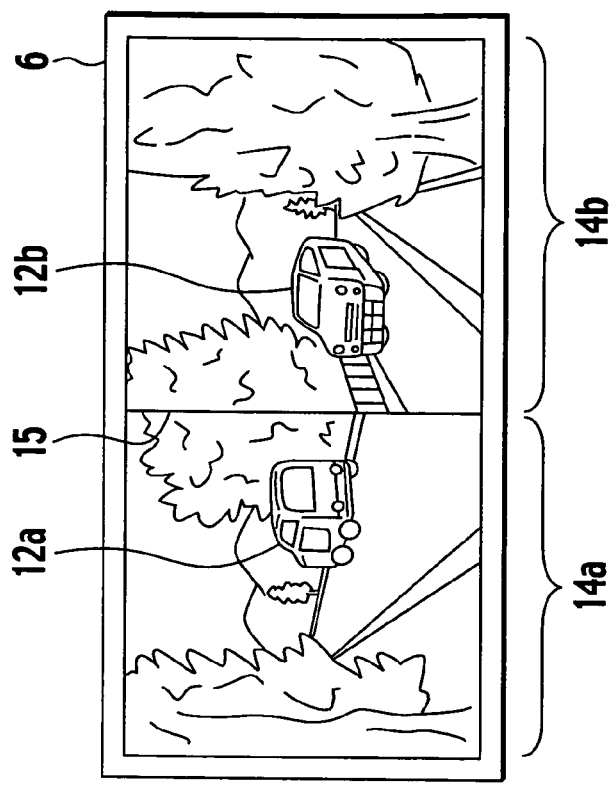
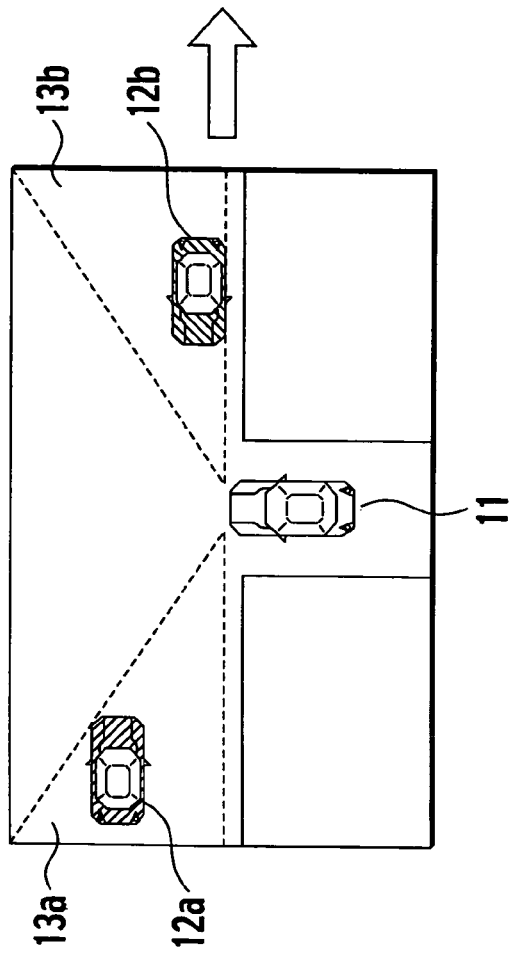

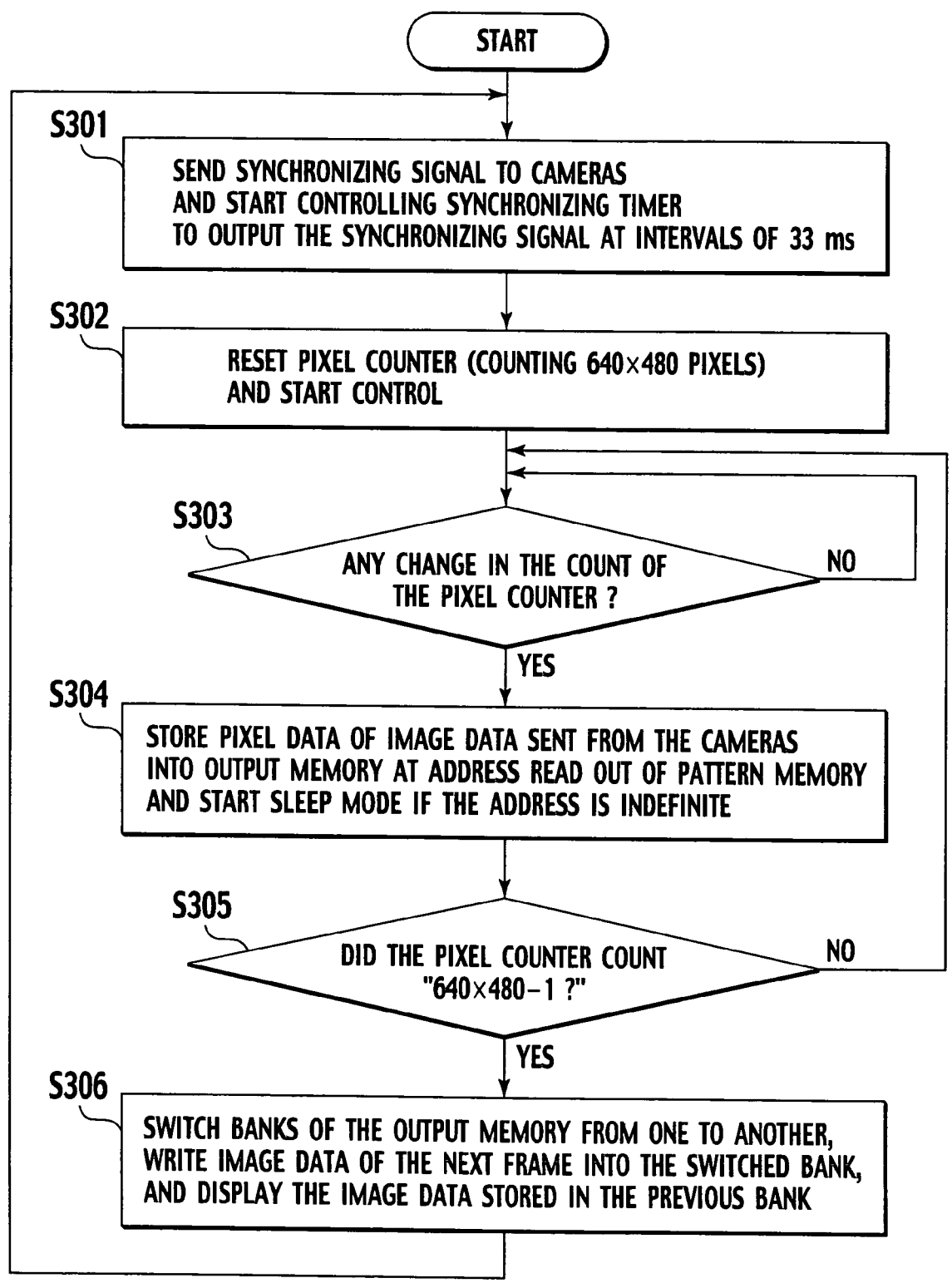

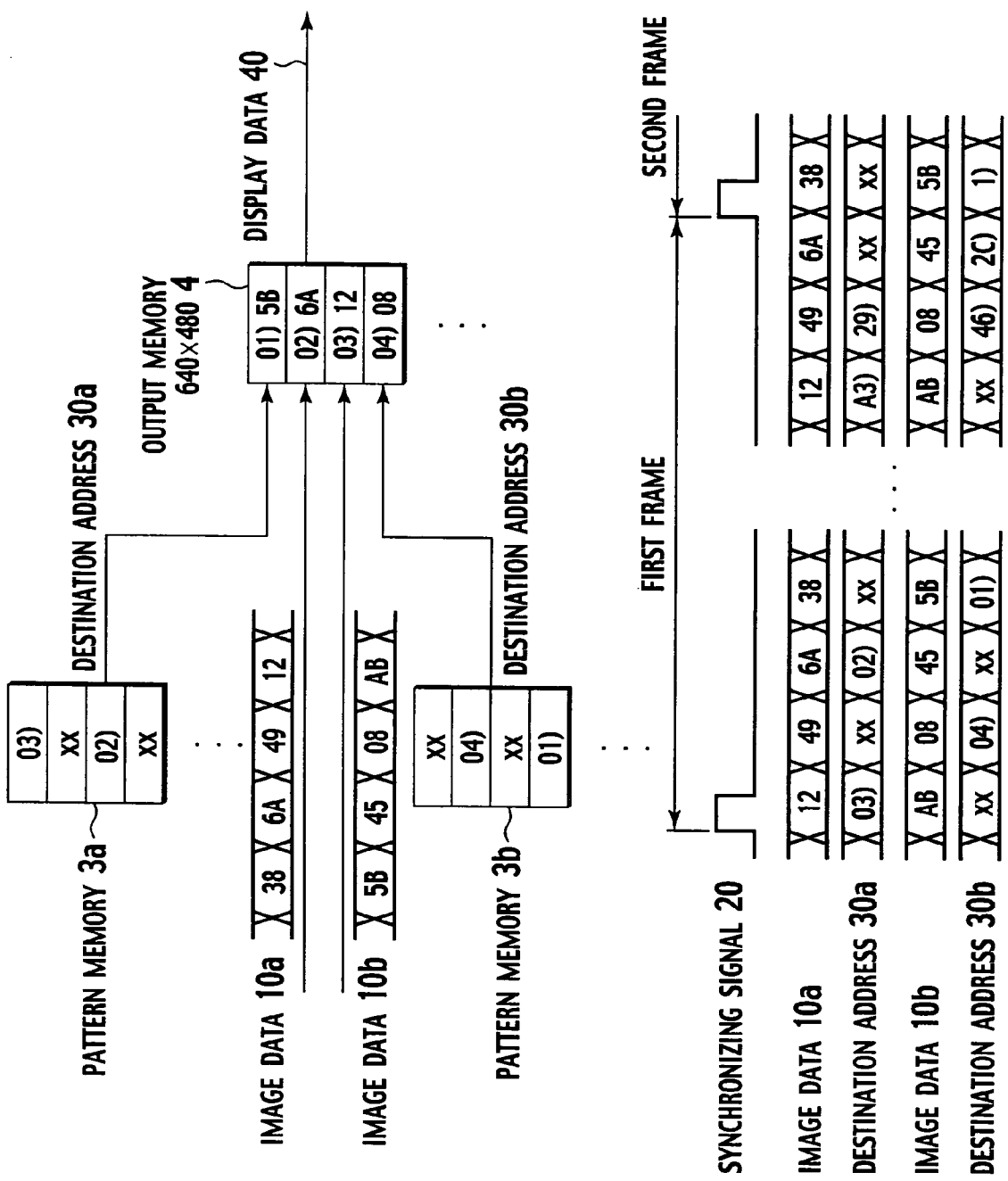

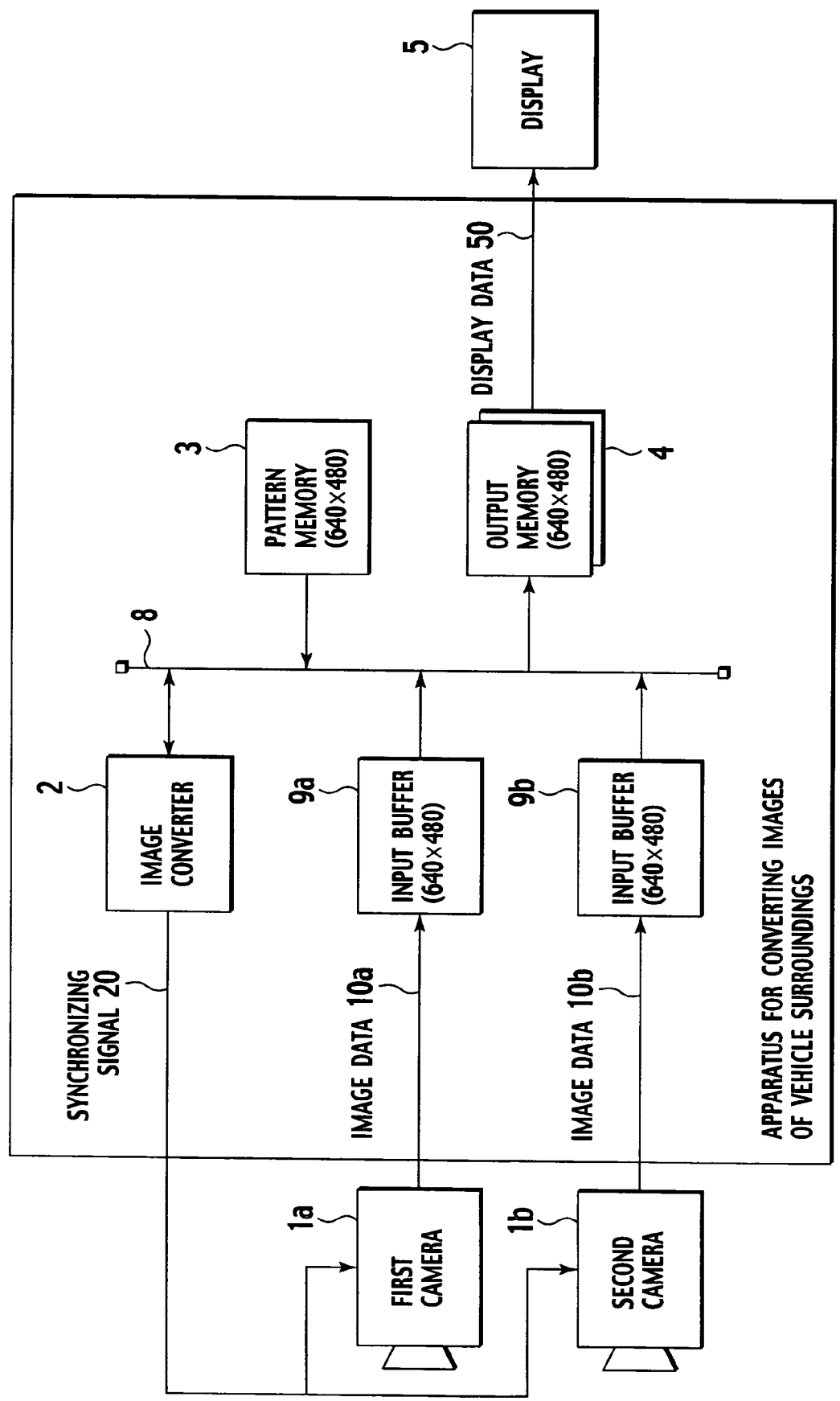

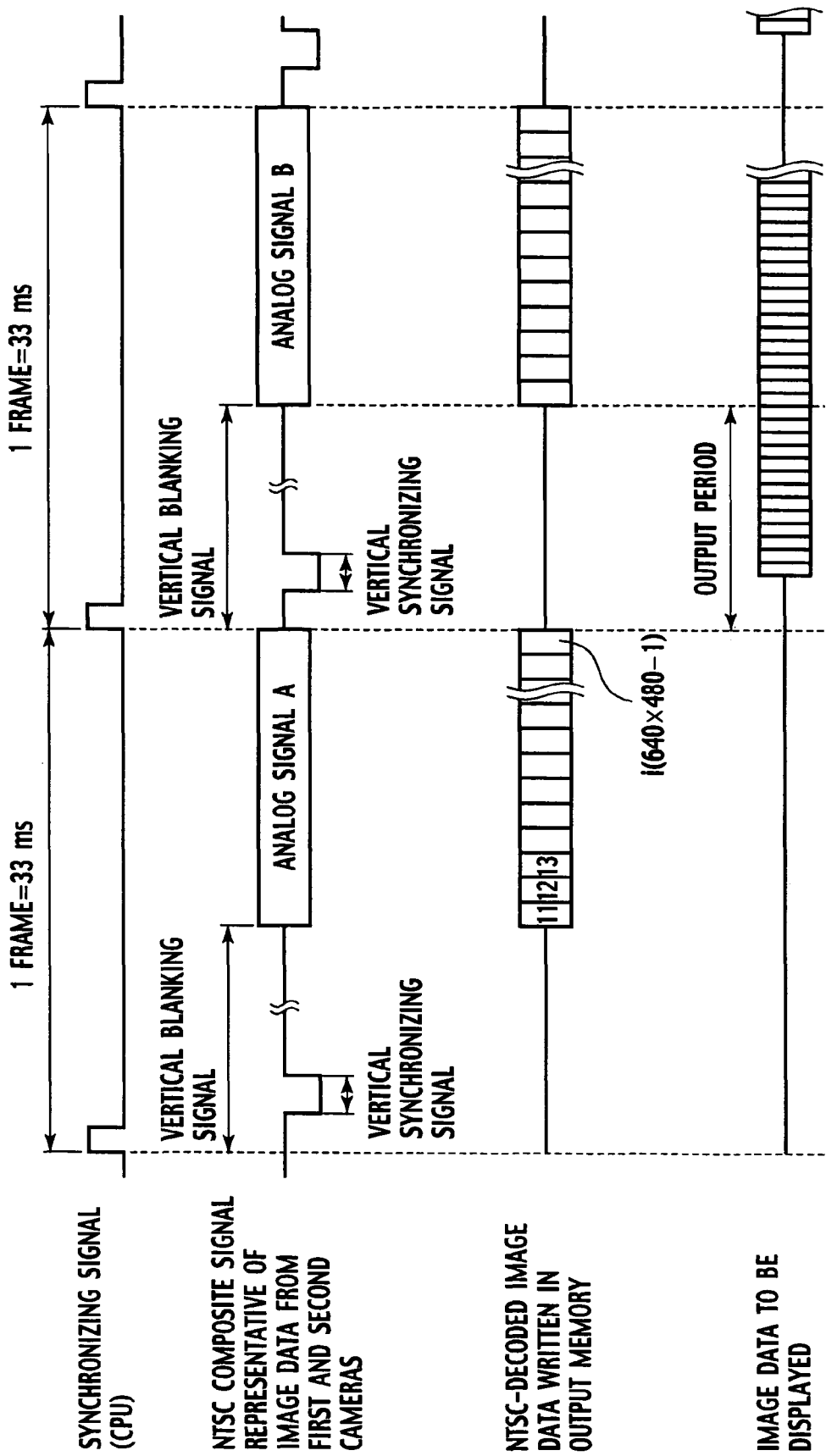

APPARATUS FOR CONVERTING IMAGES OF VEHICLE SURROUNDINGS

BACKGROUND OF THE INVENTION

The present invention relates to an apparatus for converting images of vehicle surroundings used for, for example, a driving support system for supporting driver's visibility.

Japanese Laid-Open Patent Publication No. Hei-11-328368 discloses an apparatus for converting images of vehicle surroundings used for helping the field of vision of a driver when the driver reverses up the vehicle into a garage, brings the vehicle closer to the roadside for parking, or drives the vehicle into a crossing or a T junction where the driver's visibility is poor.

This apparatus includes an electronic camera to photograph, for example, a rear view of the vehicle, or a blind corner view (front left or right view) of the vehicle. There is an increasing need for simultaneously providing the driver with multidirectional images around the vehicle. Under the situation, the driving support system employs a plurality of cameras to pick up images around the vehicle and provide the driver with a plurality of images side by side on a display.

The arrangement and operation of an apparatus for converting images of vehicle surroundings according to a related art will be explained. The related art in the following explanation employs VGA (video graphics array) of 640×480 pixels as an image output resolution of a camera and a display resolution presented for a driver.

To absorb a difference between the image data transmission rate of a camera and the processing speed of a CPU (central processing unit), the related art arranges an input frame buffer between the camera and the CPU. The input frame buffer has two banks for each camera, and the size of each bank is selected to cover an address space of 640×680 pixels of the camera. When a frame of image data is transmitted from the camera and is completely stored in one bank of the input frame buffer, the CPU carries out an image conversion process on the bank that has stored the image data. At the same time, the other bank of the input frame buffer is prepared for receiving the next frame of image data. These operations are repeated. From the bank of the input frame buffer on which the image conversion process has been conducted, the CPU reads image data according to addresses stored in a pattern memory and stores the read image data in an output memory.

When employing a plurality of cameras and displaying a plurality of images side by side on a single display, it is usual to partly thin images from the cameras and display the thinned images. If two cameras each of VGA size are employed, two systems of image data are provided from the cameras. These two systems of image data are thinned in a read process and the thinned image data is displayed on a display. To prevent images presented for the driver from flickering, the CPU usually displays a frame of image data after the image data is completely stored in the output memory.

SUMMARY OF THE INVENTION

The related art mentioned above involves a delay of one frame in the input frame buffer and another delay of one frame in the output memory when the timing of data presentation is synchronized with the timing of bank switching of the input frame buffer. Namely, the related art involves a delay of two frames in total. Suppose that an NTSC (National Television System Committee) image signaling method is employed, the delay of two frames corresponds to 66 ms (millisecond(s)). For instance, an object moving at a speed of 36 km/h, the delay of 66 ms corresponds to a 66-cm (centimeter(s)) shift from an actual position of the object. If the apparatus is used at a low speed to park the vehicle or bring the vehicle closer to the roadside, such a delay will be allowable. However, if the apparatus is used at a high speed to drive the vehicle into a crossing or T junction or to pass another vehicle, such a delay can be critical for safety. A discrepancy between an actual movement of the vehicle and a movement of an image of the vehicle on a display will cause an inconvenience for the driver. At the start of the vehicle, for example, no movement will be observed on the display although the vehicle is actually moving. At the stoppage of the vehicle, movement will be observed on the display although the vehicle is actually stopped. These discrepancies due to the operation delay of the apparatus irritate the driver and cause a serious problem for safe driving.

To solve the problem, the present invention provides an apparatus for converting images of vehicle surroundings, capable of reducing an image presentation delay on a display in a vehicle.

An aspect of the present invention provides an apparatus for converting images of vehicle surroundings that includes, at least one camera configured to start, upon receiving a synchronizing signal, photographing the surroundings of a vehicle and outputting image data representative of the photographs, an output memory configured to store image data to be displayed on a display installed in the vehicle, a pattern memory configured to store destination addresses of the output memory, and an image converter configured to generate the synchronizing signal, obtain the image data from the camera, and transfer part or the whole of the image data to the output memory according to the destination addresses stored in the pattern memory.

BRIEF DESCRIPTION OF THE DRAWINGS

FIG. 1 shows a configuration of the apparatus according to the first embodiment.

FIG. 2A is a top view showing a vehicle 11 entering a T junction where a perspective is poor and two vehicles are approaching the vehicle 11, and FIG. 2B shows a screen of a display 5 displaying the surrounding images of the vehicle 11 provided by an apparatus for converting images of vehicle surroundings according to a first embodiment of the present invention.

FIG. 3 is a flowchart showing an operation of the apparatus for converting images of vehicle surroundings according to the first embodiment.

FIG. 4A is a schematic view showing an operation of the first embodiment and FIG. 4B is a timing chart showing the same.

FIG. 5 shows an apparatus for converting images of vehicle surroundings according to a second embodiment of the present invention.

FIG. 11 shows an example of input/output timing of the apparatus for converting images of vehicle surroundings according to the present invention with image data to be presented for the driver being updated frame by frame and the address conversion process being conducted pixel by pixel.

DETAILED DESCRIPTION OF EMBODIMENTS

Figure 6:
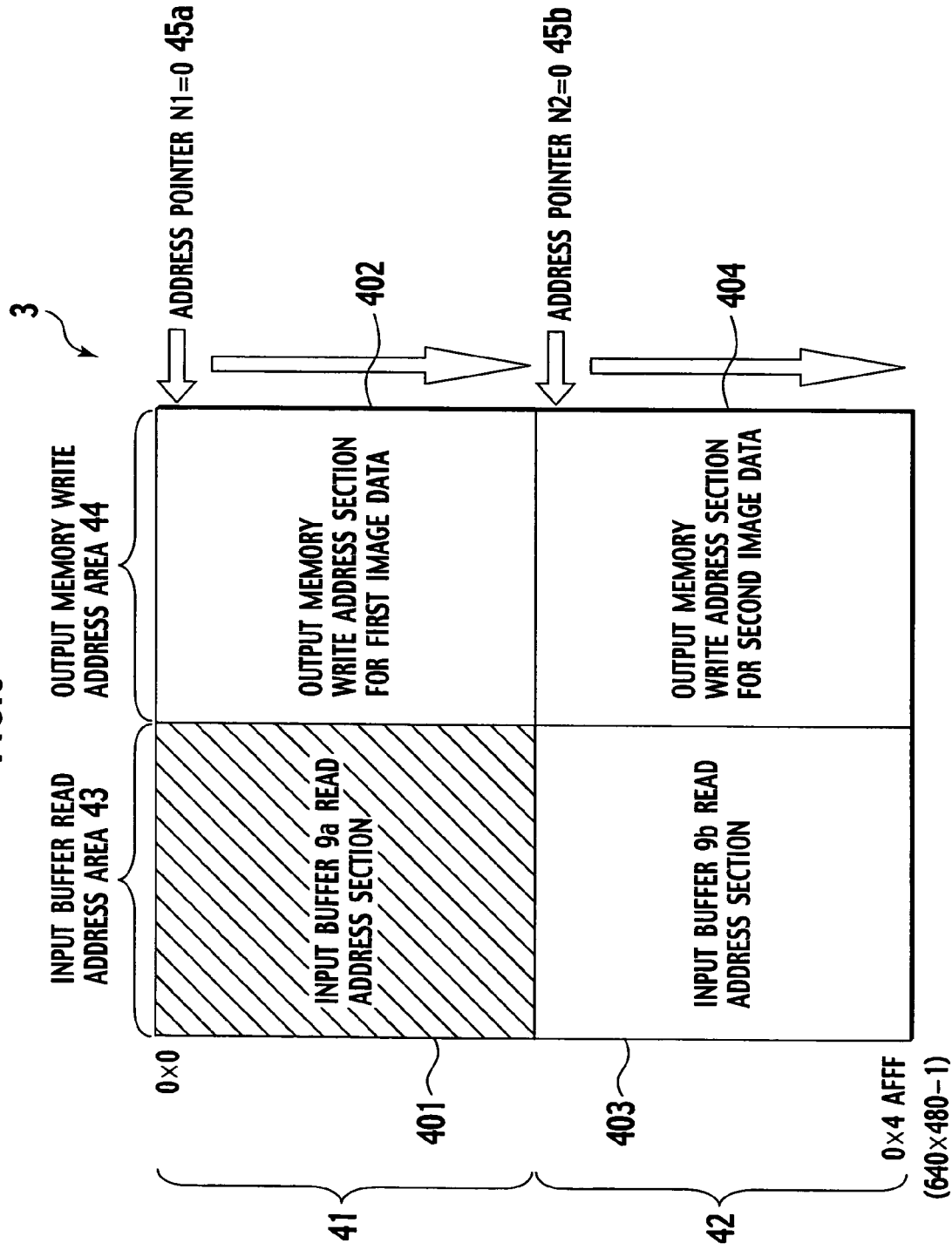
FIG. 6 shows an example of a memory map of the pattern memory 3.

Various embodiments of the present invention will be described with reference to the accompanying drawings. It is to be noted that same or similar reference numerals are applied to the same or similar parts and elements throughout the drawings, and the description of the same or similar parts and elements will be omitted or simplified.

First Embodiment

FIG. 2A is a top view showing a vehicle 11 entering a T junction where a perspective is poor and two vehicles are approaching the vehicle 11. FIG. 2B shows a screen of a display 5 displaying the surrounding images of the vehicle 11 provided by an apparatus for converting images of vehicle surroundings according to a first embodiment of the present invention. The apparatus is installed in the vehicle 11 and the images on the display 5 are presented for the driver of the vehicle 11.

In FIG. 2A, a left camera installed at a front left position on the vehicle 11 obtains an image in a range 13a, and a right camera installed at a front right position on the vehicle 11 obtains an image in a range 13b. When the vehicle 11 enters the T junction, the vehicle 12a straightly running toward the vehicle 11 from the left side is photographed by the left camera, and the vehicle 12b straightly running toward the vehicle 11 from the right side is photographed by the right camera.

In FIG. 2B, the display 5 displays blind corner views, i.e., front left and right views around the vehicle 11. The display 5 displays the left image of the vehicle 11 picked up by the left camera in a left part 14a of the display 5 and the right image of the vehicle 11 picked up by the right camera in a right part 14b of the display 5. The left part 14a shows an image 12a' of the vehicle 12a, and the right part 14b shows an image 12b' of the vehicle 12b. To separate the left part 14a and right part 14b from each other, a partition line (mask image) 15 may be set on the display 5.

Now, an apparatus for converting images of vehicle surroundings according to the first embodiment of the present invention will be explained with reference to the drawings. According to this embodiment, an output resolution of image data picked up by each camera is VGA (640×680 pixels), and a resolution of the display 5 to present images for the driver is also VGA.

FIG. 1 shows a configuration of the apparatus according to the first embodiment. In FIG. 1, electronic cameras 1a and 1b for photographing the surroundings of a vehicle are installed at predetermined positions on the vehicle. The apparatus includes an image converter 2 for converting images received from the cameras, pattern memories 3a and 3b, an output memory 4, and the display 5. In FIG. 1, numerals 10a and 10b are image data, 20 is a synchronizing signal, and 40 is display data presented on the display 5 for the driver.

The image converter 2 supplies the synchronizing signal 20 to the cameras 1a and 1b. In response to the synchronizing signal 20, the cameras 1a and 1b start to transmit image data 10a and 10b frame by frame. An image transmission method between the cameras 1a and 1b and the image converter 2 is, for example, NTSC. In this case, the image converter 2 provides the synchronizing signal 20 at frame intervals, i.e., every 33 ms. The image converter 2 controls the supply of the synchronizing signal 20, an address conversion process, and a write process. The image converter 2 has a pixel counter 24 whose capacity corresponds to the output resolution (640× 680 pixels) of the cameras 1a and 1b. The number of the pattern memories 3a and 3b corresponds to the number of the cameral 1a and 1b, i.e., two. Each of the pattern memories 3a and 3b has an address space covering 640×680 pixels matching with the output resolution of each camera. The output memory 4 consists of two banks each having an address space covering 640×680 pixels matching with the resolution of the display 5. One of the banks is used to store display data 40 to be written therein, and the other bank is used to output stored display data 40 to the display 5.

The image converter 2 includes a controller 22 to conduct various operations, a synchronizing timer 23 to output the synchronizing signal 20, and the pixel counter 24. The controller 22 instructs the synchronizing timer 23 to transmit the synchronizing signal 20 to the cameras 1a and 1b at predetermined intervals. In response to the synchronizing signal 20, the cameras 1a and 1b output data representative of photographed images. The data is transferred to the controller 22 through a bus 8 and is temporarily stored in the controller 22. In synchronization with the synchronizing signal 20, the controller 22 resets the pixel counter 24 to zero. The pixel counter 24 continuously increments its count at predetermined timing. The timing of the increment is set according to the timing of fetching the image data 10a and 10b pixel by pixel.

The controller 22 provides the pattern memories 3a and 3b with a count of the pixel counter 24 through the bus 8, and the pattern memories 3a and 3b provide each a destination address corresponding to the count. The controller 22 receives the destination addresses from the pattern memories 3a and 3b, and according to the received addresses, stores pixel data of the image data 10a and 10b in the output memory 4. The image data 10a from the camera 1a is stored in the output memory 4 according to destination addresses stored in the pattern memory 3a, and the image data 10b from the camera 1b is stored in the output memory 4 according to destination addresses stored in the pattern memory 3b. These operations are conducted on each pixel data piece of the image data 10a and 10b. After completely storing image data for a screen of the display 5, the output memory 4 provides the display 5 with the stored data as display data 40, and the display 5 displays the display data 40. As mentioned above, the output memory 4 has a bank for receiving image data and another bank for outputting display data to the display 5. Namely, while the first bank is storing image data, the second bank provides the display 5 with display data. When the first bank completely stores a frame of image data, the first bank provides the display 5 with the stored data, and the second bank starts to receive new image data.

FIG. 3 is a flowchart showing an operation of the apparatus for converting images of vehicle surroundings according to the first embodiment. The image converter 2 transmits the synchronizing signal 20 to the cameras 1a and 1b at predetermined intervals. The NTSC image transmission method exemplary employed by the embodiment involves a frame period of 33 ms, and therefore, the synchronizing signal 20 serving as a trigger signal is transmitted at the intervals of 33 ms. Step S301 starts to control the synchronizing timer 23 to provide the synchronizing signal 20 at the intervals of 33 ms.

There are two reasons to synchronize the cameras 1a and 1b with each other. First is to provide the driver with simultaneous information from the cameras. Second is to reduce load on the image converter 2. Namely, in synchronization with the synchronizing signal 20, the image converter 2 can read the pattern memories 3a and 3b from the start thereof when conducting an address conversion process.

When the synchronizing signal 20 is sent, step S302 resets the pixel counter 24 to zero and starts control with the use of the pixel counter 24. The pixel counter 24 is used to synchronize the reception timing of the image data 10a and 10b with the write timing to the output memory 4. When the pixel counter 24 increments its count, the image data 10a and 10b are written in the output memory 4 at write addresses (destination addresses) that are stored in and read out of the pattern memories 3a and 3b. With the NTSC image transmission method, the image data 10a and 10b having the output resolution of the cameras 1a and 1b are transmitted within a frame transmission period of 33 ms. Namely, with the cameras 1a and 1b having each an output resolution of VGA (640×680 pixels), the pixel counter 24 counts up at the intervals of 107 ns.

The image data write timing mentioned above may be secured by multiplexing a timing signal over each pixel of the image data 10a and 10b transmitted from the cameras 1a and 1b and by detecting the timing signal with the image converter 2.

In step S303, the image converter 2 determines whether or not the pixel counter 24 has changed its count. If the count of the pixel counter 24 has been changed, step S304 stores a pixel of each of the image data 10a and 10b transmitted from the cameras 1a and 1b in the output memory 4 according to destination addresses stored in the pattern memories 3a and 3b. At timing generated by the synchronizing timer 23, the cameras 1a and 1b provide the image data 10a and 10b pixel by pixel, which are fetched by the image converter 2. If there is an indefinite destination address, the image converter 2 enters a sleep mode. This will be explained later in detail.

Step S305 determines whether or not all pixels of the image data 10a and 10b from the cameras 1a and 1b have been processed. According to the first embodiment, determining whether or not all pixels of the image data 10a and 10b from the cameras 1a and 1b have been processed is conducted by determining whether or not the count of the pixel counter 24 is equal to "640×680−1." If the count of the pixel counter 24 is below "640×680−1," the write operation of steps S303 to S305 is repeated.

If the count of the pixel counter 24 is equal to "640×680−1" in step S305, it is determined that the image data 10a and 10b of one frame have completely been processed. Accordingly, the banks of the output memory 4 are switched from one to another, and image data 10a and 10b of the next frame are written therein. The bank of the output memory 4 into which image data has completely been written is subjected to a process of presenting the image data for the driver. The reason why the output memory 4 consists of two banks is to suppress the flickering of images to be presented for the driver.

FIG. 4A is a schematic view showing an operation of the first embodiment and FIG. 4B is a timing chart showing the same. As explained above, the cameras 1a and 1b provide two systems of image data 10a and 10b, which are transmitted pixel by pixel at predetermined intervals in synchronization with the synchronizing signal 20, as shown in the timing chart of FIG. 4B. The image converter 2 sequentially receives the image data 10a and 10b at the timing mentioned above and writes the image data 10a and 10b into the output memory 4 at write addresses 30a and 30b read out of the pattern memories 3a and 3b, respectively. Namely, the pattern memories 3a and 3b store the write addresses 30a and 30b of the output memory 4 for the image data 10a and 10b, respectively, and these addresses are read out of the pattern memories 3a and 3b in order of output of pixels of the image data 10a and 10b in synchronization with the synchronizing signal 20. Whenever the image data 10a and 10b are going to be output, the write addresses 30a and 30b are read out of the pattern memories 3a and 3b, and the output image data 10a and 10b are stored in the output memory 4 at the write addresses 30a and 30b. A series of these operations is the address conversion process.

When displaying a plurality of images taken by the cameras 1a and 1b side by side on the display 5 as shown in FIG. 2B, the images can be thinned out. Namely, it is not necessary to convert every address of the image data 10a and 10b. Pixels of the image data 10a and 10b that are not contained in the display data 40 are allocated with indefinite write addresses (represented with "xx" in FIGS. 4A and 4B). For these thinned pixels, the image converter 2 enters a sleep mode.

The address conversion process will be explained in more detail. In FIG. 4A, pixel data (12) from the image data 10a is stored in the output memory 4 at a write address (03), which is stored in and read out of the pattern memory 3a. At the same timing, pixel data (AB) from the image data 10b is thinned out according to an indefinite write address (xx) of the output memory 4 stored in and read out of the pattern memory 3b.

Pixel data (49) of the image data 10a is thinned out according to an indefinite write address (xx) of the output memory 4 stored in and read out of the pattern memory 3a. At the same timing, pixel data (08) from the image data 10b is written in the output memory 4 at a write address (04) that is stored in and read out of the pattern memory 3b.

Pixel data (6A) from the image data 10a is stored in the output memory 4 at a write address (02) that is stored in and read out of the pattern memory 3a. At the same timing, pixel data (45) from the image data 10b is thinned according to a write address (xx) of the output memory 4 stored in and read out of the pattern memory 3b.

Pixel data (38) from the image data 10a is thinned according to a write address (xx) of the output memory 4 stored in and read out of the pattern memory 3a. At the same timing, pixel data (5B) from the image data 10b is stored in the output memory 4 at a write address (01) that is stored in and read out of the pattern memory 3b.

Repeating these operations completes the transmission of a frame of the image data 10a and 10b. Thereafter, a next frame of image data 10a and 10b is transmitted.

As explained above, the apparatus according to the first embodiment employs the cameras 1a and 1b for photographing the surroundings of the vehicle, the image converter 2 for processing image data (image signals) 10a and 10b provided by the cameras 1a and 1b, the pattern memories 3a and 3b for storing write addresses, and the output memory 4. According to the synchronizing signal 20 serving as a trigger signal provided by the image converter 2, the cameras 1a and 1b provide the image converter 2 with the image data 10a and 10b. In response to the output of the image data 10a and 10b from the cameras 1a and 1b, the image converter 2 conducts the address conversion process to write the image data 10a and 10b into the output memory 4 according to the write addresses.

Thinning image data is achieved by ignoring, for example, part of the image data 10b while writing part of the image data 10a into the output memory 4. This scheme can relax a concentration of operations. For example, in FIG. 4B, pixel data (38) of the image data 10a has a destination address 30a of (xx), and pixel data (5B) of the image data 10b has a destination address 30b of (01). Pixel data (6A) of the image data 10a has a destination address 30a of (02), and pixel data (45) of the image data 10b has a destination address 30b of (xx). When writing part of the image data 10a into the output memory 4, the image data 10b is not written into the output memory 4. When writing part of the image data 10b into the output memory 4, the image data 10a is not written into the output memory 4. This scheme can avoid a concentration of operations.

As mentioned above, the cameras 1a and 1b are installed at proper positions on a vehicle and simultaneously provide image data 10a and 10b in response to the synchronizing signal 20 serving as a trigger. For the image data 10a and 10b, the address conversion process is conducted to reduce an input/output delay. Compared with the related art mentioned above, the first embodiment of the present invention may increase the size of the pattern memories 3a and 3b but can eliminate the input buffers of the related art and reduce an input/output delay. More precisely, the embodiment can reduce an input/output delay of two frames to one frame. Accordingly, the embodiment can provide the driver with the surrounding images of the vehicle nearly in real time to support safety driving.

Although the first embodiment employs two cameras (1a, 1b), the present invention is applicable to a system with three or more cameras or with a single camera.

According to the first embodiment, the timing of fetching image data 10a and 10b from the cameras 1a and 1b into the image converter 2, i.e., the timing of conducting the address conversion process is based on a signal generated by an internal or external frequency source. With this configuration, the image data 10a and 10b from the cameras 1a and 1b can be subjected to the address conversion process in real time without temporarily storing them in buffers.

The output memory 4 has two banks, and a result of the address conversion process is written in the output memory 4 bank by bank. This arrangement can suppress the flickering of the display 5 when presenting images for the driver.

The number of the pattern memories 3a and 3b is equal to the number of the cameras 1a and 1b, so that the pattern memories 3a and 3b are switched according to the image data 10a and 10b provided by the cameras 1a and 1b when conducting the address conversion process. If there are three or more cameras and if images of two among them are displayed side by side on the display 5 for the driver, a combination of the cameras for providing the display images is optional.

Second Embodiment

FIG. 5 shows an apparatus for converting images of vehicle surroundings according to a second embodiment of the present invention. The second embodiment assumes that the apparatus includes two cameras (i.e., an image converter 2 receives two-systems of image signals), a resolution of image data provided by each camera and a resolution of a display to display images for a driver are each VGA (640×680 pixels), and image data is updated frame by frame. Based on these assumptions, the arrangement and operation of the apparatus according to the second embodiment will be explained with reference to the drawings.

The electronic cameras 1a and 1b are set at predetermined positions on a vehicle, to pick up images of the surroundings of the vehicle. The apparatus includes the image converter 2, input buffers 9a and 9b, a pattern memory 3, an output memory 4, and the display 5 to display images stored in the output memory 4. Numerals 10a and 10b are image data, 20 is a synchronizing signal, and 50 is display data displayed on the display 5 for the driver.

The image converter 2 supplies the synchronizing signal 20 to the cameras 1a and 1b. In response to the synchronizing signal 20, the cameras 1a and 1b start to transmit each a frame of image data 10a (10b). An image transmission method between the cameras 1a and 1b and the image converter 2 is, for example, NTSC. In this case, the image converter 2 provides the synchronizing signal 20 at frame intervals, i.e., every 33 ms in this embodiment.

The image converter 2 controls the supply of the synchronizing signal 20 and an address conversion process. The image converter 2 has a pixel counter (not shown) whose capacity corresponds to the output resolution (640×680 pixels) of the cameras 1a and 1b.

The input buffers 9a and 9b are provided for the cameras, respectively. The size of each input buffer corresponds to the resolution of the camera and has an address space of 640×480 pixels. Each of the input buffers 9a and 9b may be a ring buffer to store image data in a cyclic manner. The ring buffer is a memory employing a cyclic addressing method. A data piece firstly written in a data queue in the ring buffer is read at first. Namely, the ring buffer employs a FIFO (first-in, first-out) data processing method.

A frame of image data transmitted from each of the cameras 1a and 1b is stored in a corresponding one of the input buffers 9a and 9b. Thereafter, the image converter 2 overwrites each input buffer with image data of the next frame from the start address of the input buffer. The reason why the input buffers 9a and 9b are each of a single bank is because the image converter 2 successively carries out an address conversion process on arrived image data, and therefore, there is no need of storing the image data for a long time, e.g., a frame period of 33 ms.

The output memory 4 consists of two banks each covering an address space of 640×480 pixels corresponding to the resolution of the display 5. One of the banks is used to store display data to be displayed, and the other bank is used to output display data to the display 5.

The pattern memory 3 has areas or banks whose number corresponds to the number of the cameras 1a and 1b, and each area or bank has an address space of 640×680 pixels corresponding to the resolution of the display 5.

FIG. 6 shows an example of a memory map of the pattern memory 3. In FIG. 6, a first camera address area 41 is for the input buffer 9a and consists of sections 401 and 402. A second camera address area 42 is for the input buffer 9b and consists of sections 403 and 404. An input buffer read address area 43 consists of the sections 401 and 403, and an output memory write address area 44 consists of the sections 402 and 404. The section 401 is an input buffer read address section for first image data. The section 402 is an output memory write address section for the first image data. The section 403 is an input buffer read address section for second image data. The section 404 is an output memory write address section for the second image data. There are pointers 45a and 45b. For example, the two cameras 1a and 1b shown in FIG. 2A are employed to pick up images, which are displayed side by side on the display 5 as shown in FIG. 2B. In this case, the pattern memory 3 is divided into the address area 41 for image data 10a from the camera 1a and the address area 42 for image data 10b from the camera 1b. Image data of a pixel (pixel data) may be written into a plurality of addresses. For this, the area 43 stores, from the start thereof, read addresses of the input buffers 9a and 9b in order of pixel data to be input into the apparatus, and the area 44 stores write addresses of the output memory 4 in order of pixel data. In this way, an address conversion map of the pattern memory 3 covers the read addresses of the input buffers 9a and 9b and the write addresses of the output memory 4. The address space of the pattern memory 3 corresponds to that of the output memory 4. The areas 41 and 42 have the pointers 45a and 45b, respectively, to individually conduct an address conversion process on a plurality of image data pieces.

Figure 7:
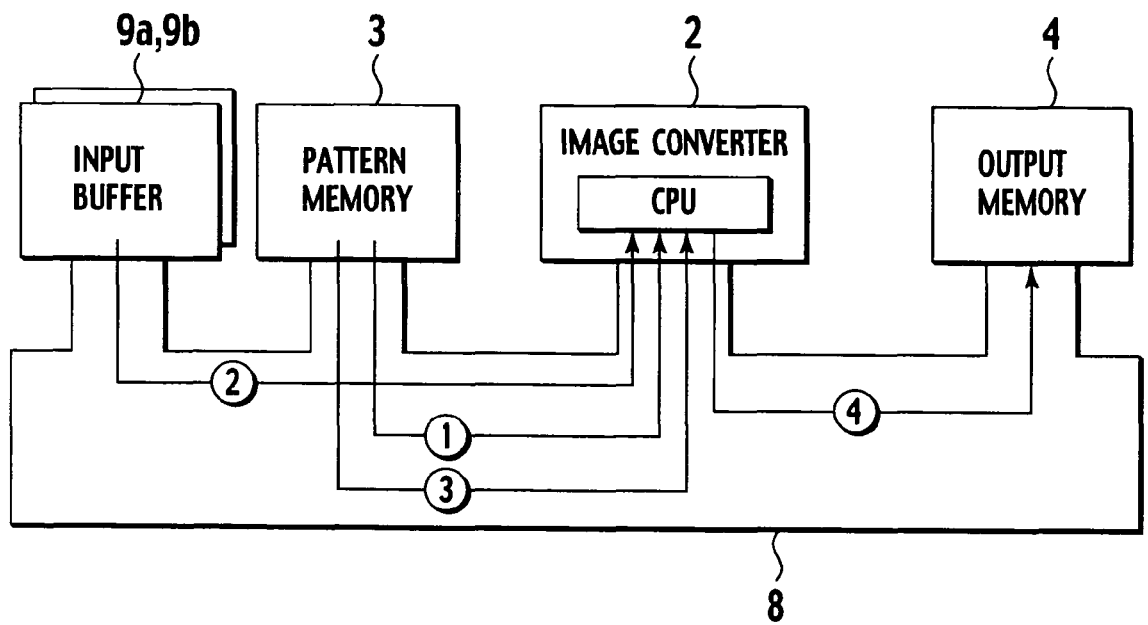
FIG. 7 shows a flow of data in an address conversion process.

FIG. 7 shows a flow of data in an address conversion process. In FIG. 7, the input buffers 9a and 9b, pattern memory 3, image converter 2, and output memory 4 are electrically connected to a bus 8, to realize data communication among these elements. The image converter 2 (1) outputs the synchronizing signal 20 and reads an input buffer read address of pixel data on which an address conversion process is conducted from the pattern memory 3, (2) if pixel data in the input buffers 9a and 9b is an object of the address conversion process, fetches the pixel data from the input buffers 9a and 9b, (3) reads an output memory write address from the pattern memory 3, and (4) writes the pixel data in the output memory 4 at the output memory write address. These operations constitute the address conversion process, and the operations (1) and (2) are a read address conversion process, and the operations (3) and (4) are a write address conversion process.

Figure 8:
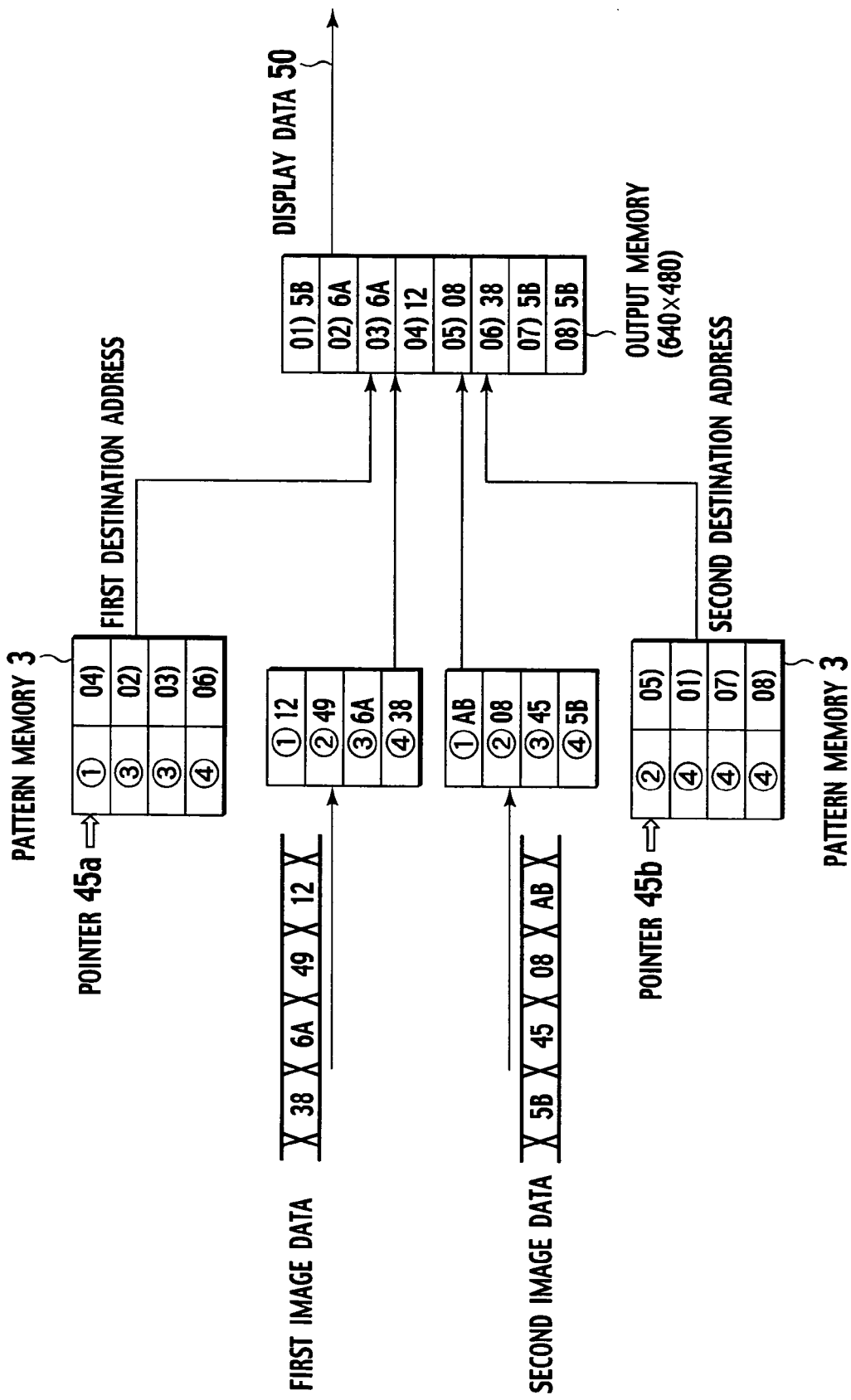
FIG. 8 is a schematic view showing an operation of the second embodiment.

FIG. 8 is a schematic view showing an operation of the second embodiment. In FIG. 8, two systems of image data are simultaneously transmitted pixel by pixel to the image converter 2 at predetermined intervals. The image converter 2 refers to the address conversion map in the pattern memory 3, and at the timing of reception of the first pixel data, starts to sequentially write image data in the output memory 4. Mapping a piece of pixel data to a plurality of addresses as shown in FIG. 8 takes a time. This, however, will cause no problem if the processing speed of the image converter 2 is sufficiently faster than an image data transmission rate because the input buffers 9a and 9b temporarily store image data frame by frame. To prevent the flickering of images, the output memory 4 consists of two banks as shown in FIG. 5. Consequently, an input/output delay of the second embodiment is only a frame in the output memory 4. The second embodiment is achievable without regard to the number of cameras or a display image layout of the display 5.

As explained above, first image data and second image data corresponding to the two systems of image data 10a and 10b from the cameras 1a and 1b are transmitted pixel by pixel at predetermined intervals in synchronization with the synchronizing signal 20. In synchronization with the sequential transmission of the first image data and second image data, the image converter 2 writes pixel data in the output memory 4 at a write address read out of the pattern memory 3. Namely, the pattern memory 3 stores first and second write addresses of the output memory 4 for first and second pixel data to be read in this order in synchronization with the synchronizing signal 20. Whenever the first and second pixel data are output, they are stored in the output memory 4 at the first and second write addresses read out of the pattern memory 3.

An example of this operation will be explained with reference to FIG. 8. Pixel data (12) from the first image data is stored in the output memory 4 at a write address (04) that is stored in and read out of the pattern memory 3. At the same time, pixel data (AB) from the second image data is thinned according to a write address of the output memory 4 stored in and read out of the pattern memory 3.

Pixel data (49) from the first image data is thinned according to a write address of the output memory 4 stored in and read out of the pattern memory 3. At the same time, pixel data (08) from the second image data is stored in the output memory 4 at a write address (05) stored in and read out of the pattern memory 3.

Pixel data (6A) from the first image data is stored in the output memory 4 at write addresses (02) and (03) stored in and read out of the pattern memory 3. At the same time, pixel data (45) from the second image data is thinned according to a write address of the output memory 4 stored in and read out of the pattern memory 3.

Pixel data (38) from the first image data is stored in the output memory 4 at a write address (06) stored in and read out of the pattern memory 3. At the same time, pixel data (5B) from the second image data is stored in the output memory 4 at write addresses (01), (07), and (08) stored in and read out of the pattern memory 3. These operations are repeated until the first and second image data each of one frame are completely transmitted. Thereafter, first and second image data of the next frame are transmitted.

Figure 9:
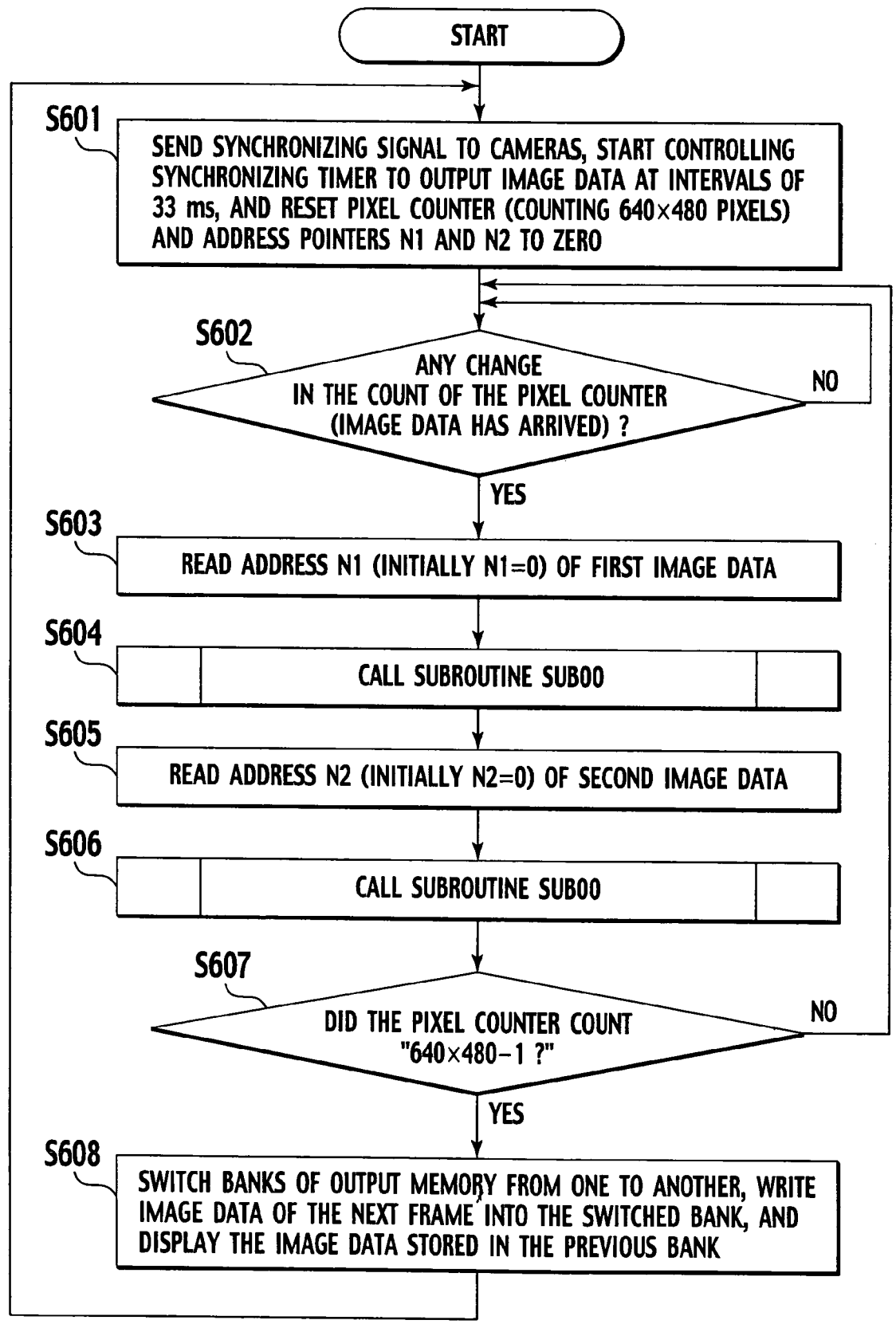
FIG. 9 is a flowchart showing a main routine carried out by the apparatus of the second embodiment.
Figure 10:
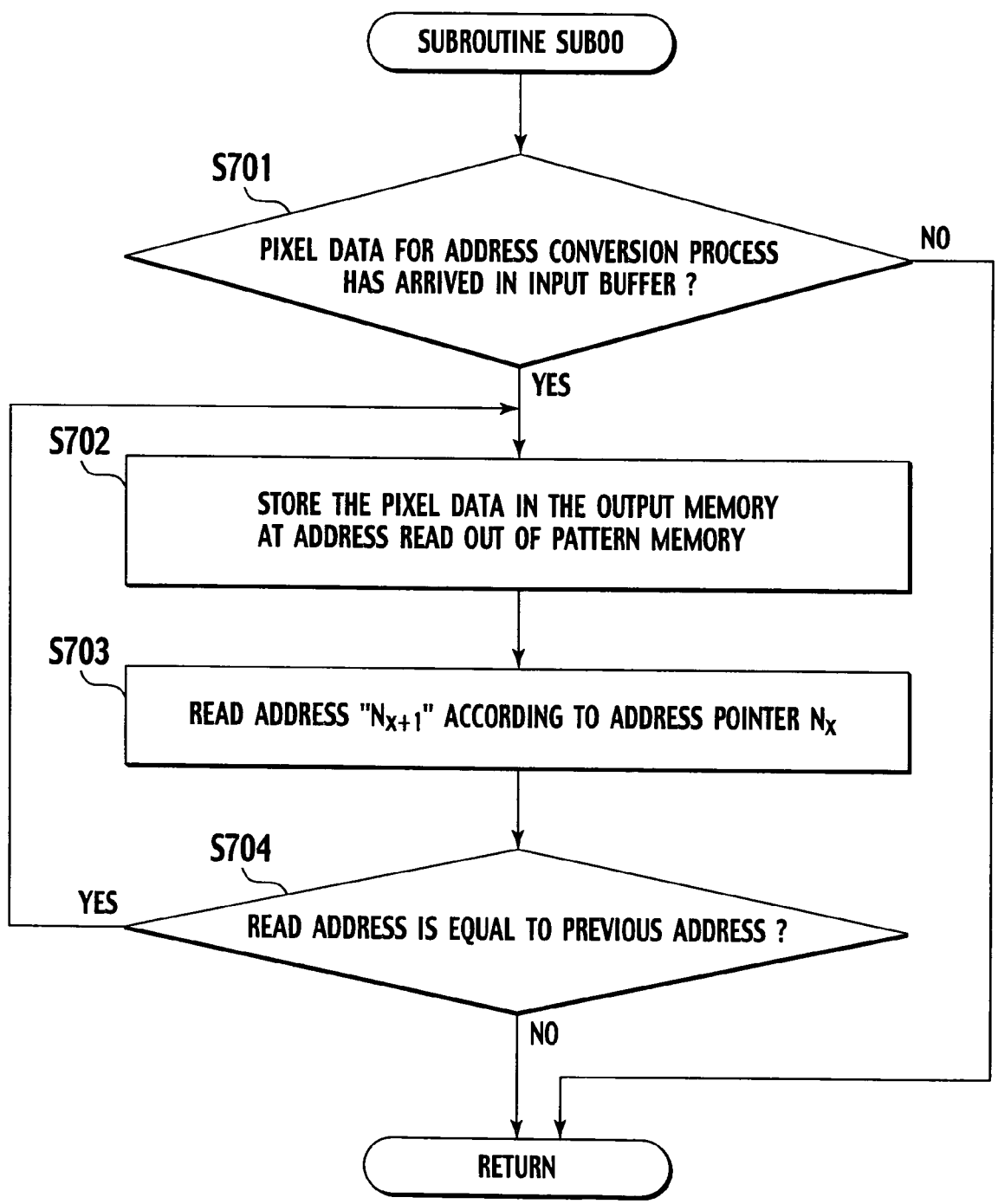
FIG. 10 is a flowchart showing a subroutine called by the main routine.

FIG. 9 is a flowchart showing a main routine carried out by the apparatus of the second embodiment, and FIG. 10 is a flowchart showing a subroutine called by the main routine.

The image converter 2 continuously transmits the synchronizing signal 20 at predetermined intervals to the cameras 1a and 1b. If the NTSC image transmission method is employed, the synchronizing signal 20 serving as a trigger signal is transmitted at the intervals of 33 ms, i.e., a frame period. At the timing of transmitting the synchronizing signal 20, step S601 resets the pixel counter to be explained later and address pointers N1 and N2 (45a and 45b of FIG. 6) to zero and starts control with the use of the pixel counter.

There are two reasons to synchronize the cameras 1a and 1b with each other. First is to provide the driver of the vehicle with simultaneous information from the cameras. Second is to reduce load on the image converter 2. Namely, in synchronization with the synchronizing signal 20, the image converter 2 can read the pattern memory 3 from the start thereof when conducting an address conversion process.

The pixel counter is used to synchronize the reception timing of first image data (image data 10a from the camera 1a of FIG. 5) and second image data (image data 10b from the camera 1b of FIG. 5) with the write timing of the first and second image data into the output memory 4. At the timing when the pixel counter increments its count, pixel data is written into the output memory 4 at a write address (output memory write address) stored in the pattern memory 3. When the NTSC image transmission method is employed, a horizontal synchronizing signal multiplexed over image data is used as a trigger to increment the pixel counter. With the NTSC image transmission method, the first and second image data having the output resolution of the cameras 1a and 1b are transmitted within a frame period of 33 ms. Namely, with the cameras 1a and 1b having each an output resolution of VGA (640×480 pixels), the pixel counter counts up at the intervals of 107 ns.

In step S602, the pixel converter 2 checks to see if the pixel counter has changed its count. If there is no change in the count, step S602 is repeated.

If it is detected in step S602 that the count of the pixel counter has changed, i.e., if pixel data has arrived, step S603 reads, from the pattern memory 3, a read address (input buffer read address) N1 of the input buffer 9a storing the first image data. Initially, N1=0.

Next, step S604 calls the subroutine SUB00 shown in FIG. 10. Step S701 of the subroutine SUB00 checks to see if the input buffer read address read in step S603 agrees with the count of the pixel counter, i.e., if the pixel data in question is an object of the address conversion process. Namely, step S701 checks to see if the pixel data on which the address conversion process is carried out has arrived at the input buffer 9a.

If step S701 determines that the input buffer read address read in step S603 agrees with the count of the pixel counter, i.e., if there is the pixel data that is an object of the address conversion process, step S702 reads an output memory write address N1=0 from the pattern memory 3 and stores the pixel data in the output memory 4 at the address. Step S703 adds 1 to the address pointer N1 (Nx) and reads an input buffer read address N1=1 of the first image data from the pattern memory 3. Step S704 checks to see if the input buffer read address read in step S703 is equal to the previous value N1=0, i.e., if the pixel data must be mapped to a plurality of addresses.

If the input buffer read address read in step S703 is equal to the previous address N1=0, i.e., if the pixel data must be mapped to a plurality of addresses, step S702 is repeated to read an output memory write address N1=1 from the pattern memory 3 and store the pixel data in the output memory 4 at the address.

This write operation is repeated as long as the pixel data satisfies the above-mentioned conditions. If the pixel data does not satisfy the conditions, i.e., if the pixel data that is an object of the address conversion process is not at the image converter 2, or if step S704 provides "No," the subroutine SUB00 is terminated and the flow returns to step S604 of the main routine.

Then, the image converter 2 similarly conducts the address conversion process on the second image data in steps S605 and S606. Namely, step S605 reads a read address (input buffer read address) N2 (initially N2=0) of the input buffer 9b storing the second image data from the pattern memory 3, and step S606 calls the subroutine SUB00.

The image converter 2 repeats the above-mentioned operations for one frame, and in step S607, determines whether or not the count of the pixel counter is equal to "640×680−1," i.e., if a frame of image data has arrived from each camera. If the count is not equal to "640×480−1" in step S607, it is determined that a frame of image data has not completely arrived yet from each camera, and the flow returns to step S602.

If, in step S607, the count is equal to "640×680−1," it means that the output memory 4 is storing all image data to be presented for the driver. Accordingly, the bank of the output memory 4 is switched to the other, and image data of the next frame is written in the switched bank. The bank of the output memory 4 that has completely received the image data is subjected to a process of presenting images for the driver in step S608. The reason why the output memory 4 has two banks is to suppress the flickering of images to be presented for the driver.

FIG. 11 shows an example of input/output timing of the apparatus for converting images of vehicle surroundings according to the present invention with image data to be presented for the driver being updated frame by frame and the address conversion process being conducted pixel by pixel. In response to the synchronizing signal 20 serving as a trigger signal, the cameras 1a and 1b transmit each a frame of image data to the image converter 2. The image data to be subjected to the address conversion process is NTSC digital image data that includes a vertical blanking signal portion that is not displayed on the display 5. Accordingly, a frame processing time may differ from one frame to another depending on the contents of the pattern memory 3. For example, there is a difference between a case that the "640×480−1"th pixel data lastly arrived from the cameras 1a and 1b is written into a plurality of addresses (640×480 addresses at the maximum) and a case that the same data is written nowhere. In practice, a piece of pixel data is frequently mapped to four addresses (double zoom) or nine addresses (triple zoom). Accordingly, even if the pattern memory 3 has a worst layout in terms of an input/output delay, the address conversion process will complete within the vertical blanking period, i.e., until image data of the next frame is transmitted to the image converter 2.

A trigger to output image data to the display 5 may be the synchronizing signal 20, or a vertical synchronizing signal multiplexed over image data of the next frame. Alternatively, the completion of storage of all image data of one frame may be a trigger to asynchronously output image data to the display 5. One of these signals or instances may fixedly or selectively be used as a trigger.

As explained above, the apparatus of the second embodiment employs the cameras 1a and 1b (or a single camera) installed on a vehicle to pick up images of the surroundings of the vehicle, the image converter 2 to convert image data 10a and 10b from the cameras 1a and 1b, the input buffers 9a and 9b arranged for the cameras 1a and 1b, respectively, the pattern memory 3 to store read and write addresses, and the output memory 4 consisting of two banks. The image converter 2 outputs the synchronizing signal 20 to the cameras 1a and 1b. In response to the synchronizing signal 20 serving as a trigger, the cameras 1a and 1b output image data 10a and 10b to the image converter 2. At the timing of outputting the image data 10a and 10b from the cameras 1a and 1b, the image converter 2 starts to write (a write address conversion process) pixel data of the image data 10a and 10b into the output memory 4 according to the write addresses. Conducting the write address conversion process on the image data 10a and 10b from the synchronized cameras 1a and 1b (or a single camera) installed on the vehicle and using the pattern memory 3 when presenting images for the driver reduce an input/output delay in the apparatus, provide the driver with images of the surroundings of the vehicle nearly in real time, and support safe driving. When changing an observing point or zooming a part of an image, the address conversion process must map a piece of pixel data to a plurality of addresses. Even in such a case, the second embodiment can reduce an input/output delay. More precisely, the second embodiment can halve an input/output delay of 2 frames (66 ms) of the related art to one frame (33 ms) at the maximum.

According to the second embodiment, the input buffers 9a and 9b are ring buffers that store image data in a cyclic manner. Even if the address conversion process takes a time in a zooming operation to map a pixel of image data to a plurality of addresses, no increase in the input/output delay will occur in the apparatus for converting images of vehicle surroundings because the image data from the cameras 1a and 1b are temporarily stored in the ring buffers and the address conversion speed of the image converter 2 is sufficiently faster than a frame rate of image data. Compared with the related art that employs two banks of memories for each camera, the embodiment can reduce the memory capacity by employing a single bank memory for each camera.

The pattern memory 3 stores read addresses of the input buffers 9a and 9b from which image data is read, as well as write addresses of the output memory 4 into which the image data is written, in order of pixel data of the image data to be output to the image converter 2, i.e., in order of pixel data on which the write address conversion process is conducted. As a result, the second embodiment can carry out the write address conversion process in real time on image data successively transmitted from the cameras 1a and 1b.

The second embodiment employs a plurality of cameras 1a and 1b, and the pattern memory 3 has areas corresponding to the cameras 1a and 1b, respectively. Equalizing the number of memory areas to the number of groups of image data 10a and 10b provided by the cameras 1a and 1b is advantageous for the write address conversion process. It is also advantageous when combining images according to the need or liking of the driver and displaying the combined images on the display 5.

The second embodiment writes a result of the address conversion process into the output memory 4 bank by bank. This suppresses the flickering of images presented on the display 5 for the driver.

After the completion of the address conversion process on all image data, a result of the address conversion process can be output and presented for the driver according to an optional output trigger. The output trigger may be generated by a frequency source in the apparatus for converting images of vehicle surroundings, or may be a synchronizing signal multiplexed over image data. These triggers may selectively be used. In this way, the second embodiment can provide the display 5 with images according to a plurality of output triggers, to vary the timing of image presentation for the driver depending on a time necessary for the address conversion process.

The embodiments mentioned above have been presented for easy understanding of the present invention and are not intended to restrict the present invention. Accordingly, the elements disclosed in the embodiments allow design changes and equivalents without departing from the technical scope of the present invention. For example, the updating of image data to be presented for the driver may be carried out not only frame (640×680 pixels) by frame but also field (640×240 pixels) by field. The address conversion process may be carried out not only pixel by pixel but also cluster (640×1) by cluster, or image data group by image data group. It is possible to employ a plurality of pattern memories 3 having different layouts. The present invention is achievable with cameras and displays of any resolutions.

The entire contents of Japanese patent applications P2003-352278 filed Oct. 10, 2003, and P2003-402416 filed Dec. 2, 2003 are hereby incorporated by reference.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for converting images of vehicle surroundings, comprising:
    at least one camera configured to start, upon receiving a synchronizing signal, photographing the surroundings of a vehicle and outputting image data representative of the photographs;
    at least one input buffer corresponding to the at least one camera, configured to receive image data from the corresponding camera and store pixel data of the image data associated with an input buffer read address;
    an output memory configured to store image data to be displayed on a display installed in the vehicle;
    a pattern memory configured to store the input buffer read addresses and a destination addresses of the output memory, each destination address associated with an input buffer read address; and
    an image converter configured to generate the synchronizing signal, obtain the image data from the camera, and transfer part or the whole of the image data to the output memory according to the destination addresses stored in the pattern memory,
    wherein the image converter comprises:
    a synchronizing timer configured to generate the synchronizing signal at predetermined intervals;
    a pixel counter configured to increment its count in synchronization with each pixel data of the image data; and
    a controller configured to reset the synchronizing timer and the pixel counter to zero, obtain a destination address of each pixel data of the image data from the pattern memory according to the count of the pixel counter, and output the pixel data to store the pixel data into the output memory at the obtained destination address,
    wherein the controller reads an input buffer read address on which an address conversion process is conducted from the pattern memory, if pixel data in the input buffer is an object of the conversion process, the controller fetches the pixel data from the input buffers, the controller reads a destination address in associate with the input buffer read address from the pattern memory, and writes the pixel data to the destination address in the output memory, and
    wherein:
    the controller is configured to provide the pattern memory with a count of the pixel counter,
    the pattern memory is configured to provide each destination address corresponding to the count, and
    the controller is configured to store the image data in the output memory according to the destination addresses provided by the pattern memory.

2. The apparatus as claimed in claim 1, wherein:
    the controller receives a clock signal from a frequency source that is internal or external to the apparatus and conducts operations according to the clock signal.

3. The apparatus as claimed in claim 1, wherein the output memory comprises:
    a first storage area configured to receive image data from the image converter, and after completely receiving the image data, the first storage area configured to output the received image data to the display of the vehicle; and
    a second storage area configured to output stored image data to the display of the vehicle while the first storage area is receiving image data, and while the first storage area is outputting stored image data to the display, the second storage area configured to receive image data from the image converter.

4. The apparatus as claimed in claim 1, wherein:
    the pattern memory is individually arranged for the camera and is configured to store destination addresses of the output memory where the image data from the camera is stored.

5. The apparatus as claimed in claim 1, wherein:
    the input buffer is a ring buffer configured to store the image data in a cyclic manner.

6. The apparatus as claimed in claim 1, wherein the pattern memory stores:
    read addresses of the input buffer aligned in order of pixel data pieces of the image data to be processed by the image converter; and
    destination addresses of the output memory aligned in order of pixel data pieces of the image data to be processed by the image converter.

7. The apparatus as claimed in claim 1, wherein:
    the pattern memory has an individual area for each of the camera; and
    the image converter obtains, for received image data, read and destination addresses specific to the camera that has provided the image data.

8. The apparatus as claimed in claim 1, wherein the output memory comprises:
   a first storage area configured to receive image data from the image converter, and after completely receiving the image data, output the received image data to the display of the vehicle; and
   a second storage area configured to output stored image data to the display of the vehicle while the first storage area is receiving image data, and while the first storage area is outputting stored image data to the display, receive image data from the image converter.

9. The apparatus as claimed in claim 1, wherein:
   the output memory receives an output trigger signal, and in response to the output trigger signal, outputs stored image data to the display.

10. The apparatus as claimed in claim 9, further comprising:
    a frequency source configured to output a signal at predetermined intervals,
    the output memory receiving the signal from the frequency source, and according to the received signal, outputting stored image data to the display.

11. The apparatus as claimed in claim 10, wherein:
    the output memory receives the signal from the frequency source or a synchronizing signal multiplexed over the image data, and according to the received signal, outputs stored image data to the display.

12. The apparatus as claimed in claim 9, wherein:
    the output memory receives a synchronizing signal multiplexed over the image data, and according to a signal based on the received synchronizing signal, outputs stored image data to the display.

13. An apparatus for converting images of vehicle surroundings, comprising:
    at least one camera for starting, upon receiving a synchronizing signal, photographing the surroundings of a vehicle and outputting image data representative of the photographs;
    at least one input buffer means corresponding to at least one camera, for receiving image data from the corresponding camera and store pixel data of the image data associated with an input buffer read address;
    an output memory means for storing image data to be displayed on a display installed in the vehicle;
    a pattern memory means for storing the input buffer read addresses and a destination addresses of the output memory means, each destination address associated with input buffer read address; and
    an image converter means for generating the synchronizing signal, obtaining the image data from the camera, and transferring part or the whole of the image data to the output memory means according to the destination addresses stored in the pattern memory means, wherein the image converter means comprises:
    a synchronizing timer means for generating the synchronizing signal at predetermined intervals;
    a pixel counter means for incrementing count in synchronization with each pixel data of the image data; and
    a controller means for resetting the synchronizing timer and the pixel counter to zero, obtaining a destination address of each pixel data of the image date from the pattern memory according to the count of the pixel counter, and outputting the pixel data to store the pixel data into the output memory at the obtained destination address,
    wherein the controller reads an input buffer read address on which an address conversion process is conducted from the pattern memory, if pixel data in the input buffer is an object of the conversion process, the controller fetches the pixel data from the input buffers, the controller reads a destination address in associate with the input buffer read address from the pattern memory, and writes the pixel data to the destination address in the output memory.

* * * * *